United States Patent Office 2,835,160
Patented May 20, 1958

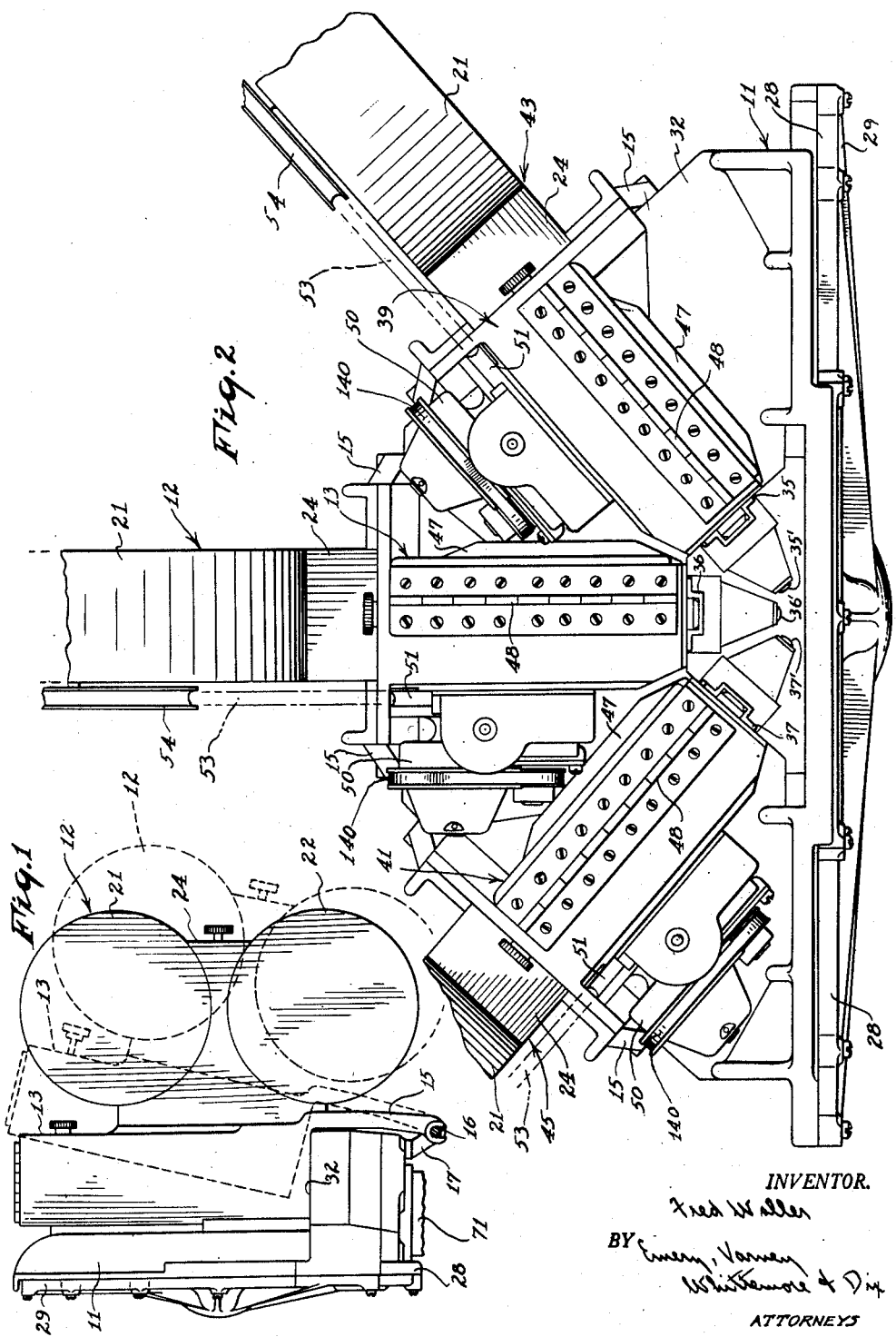

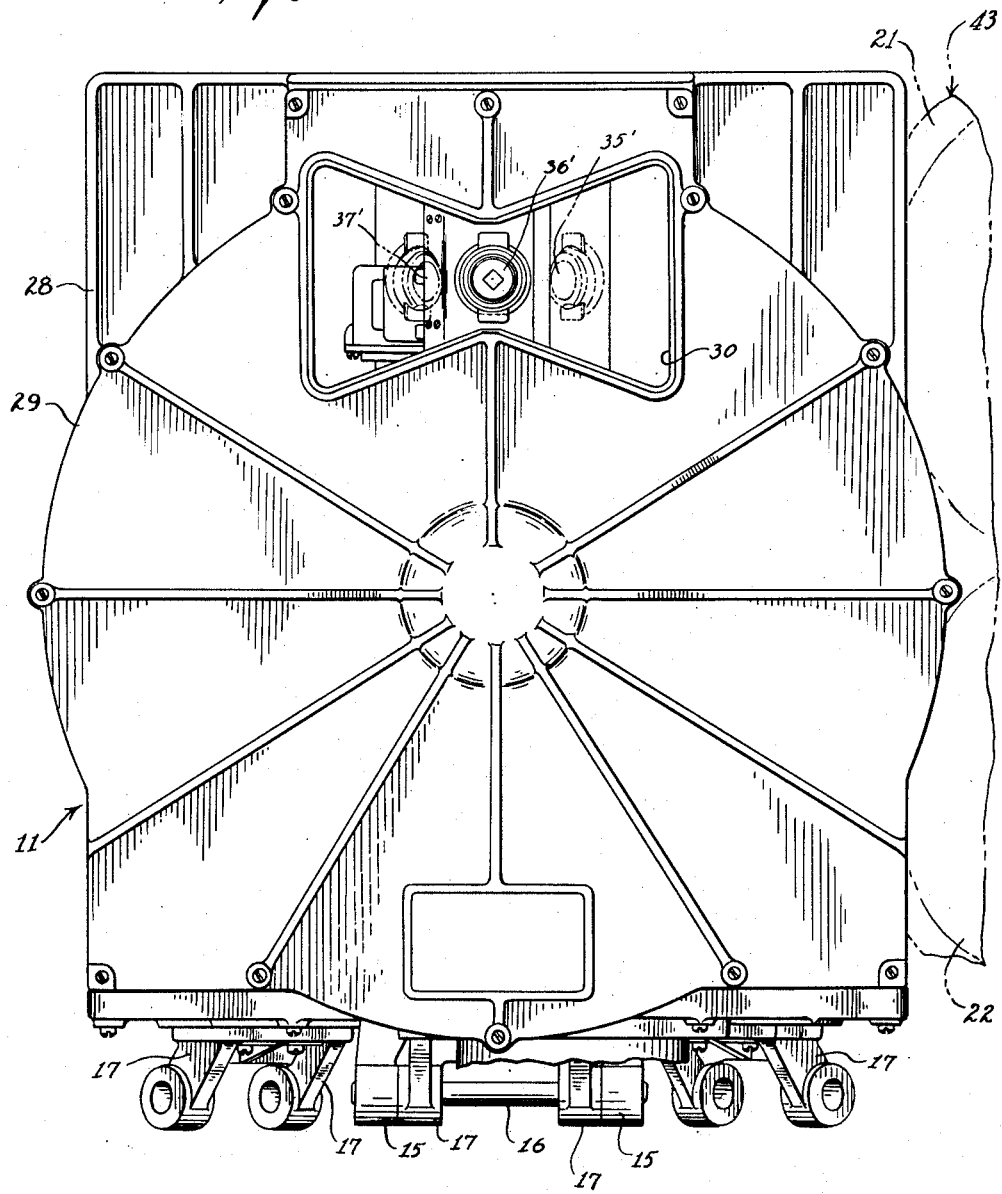

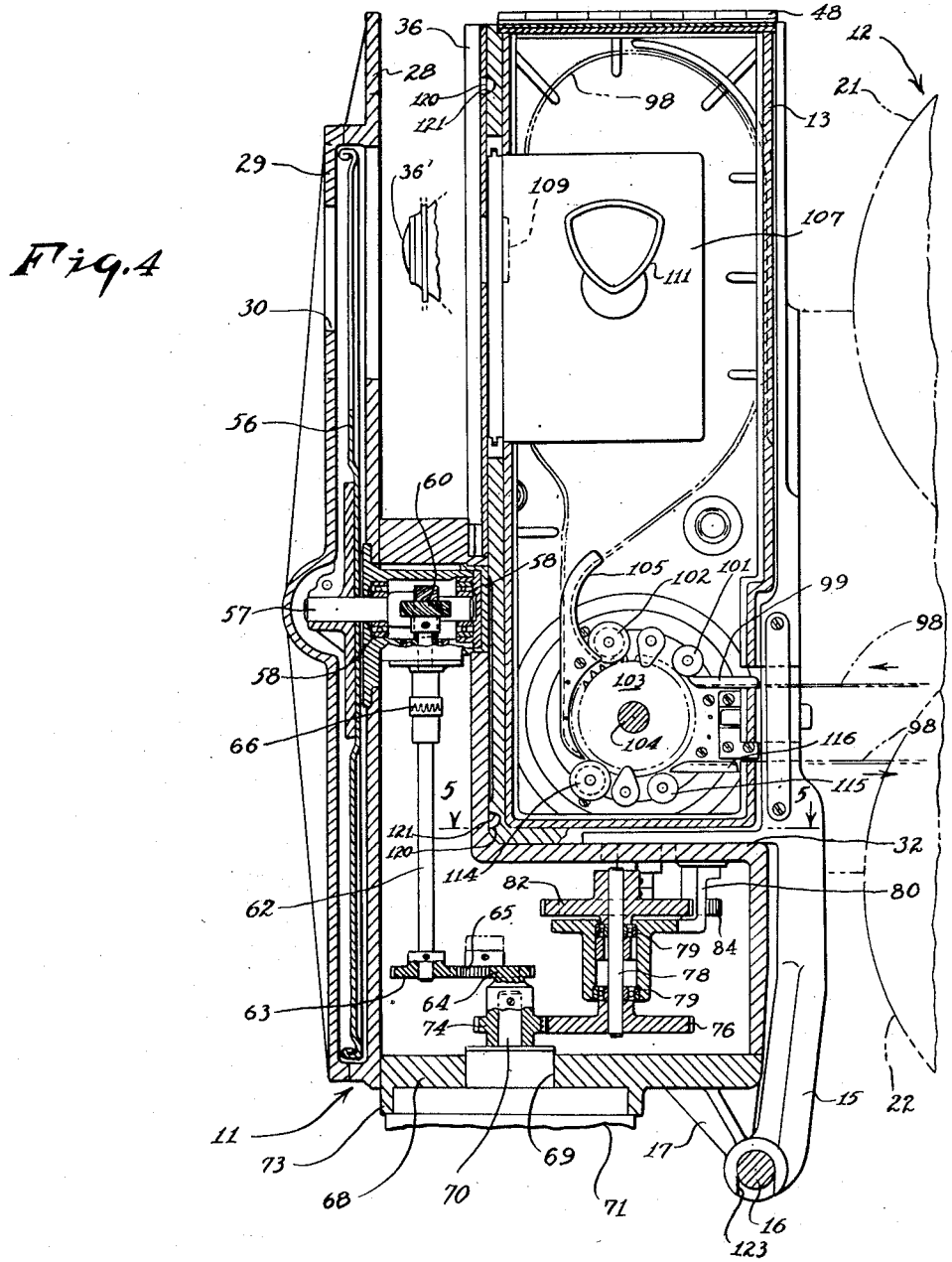

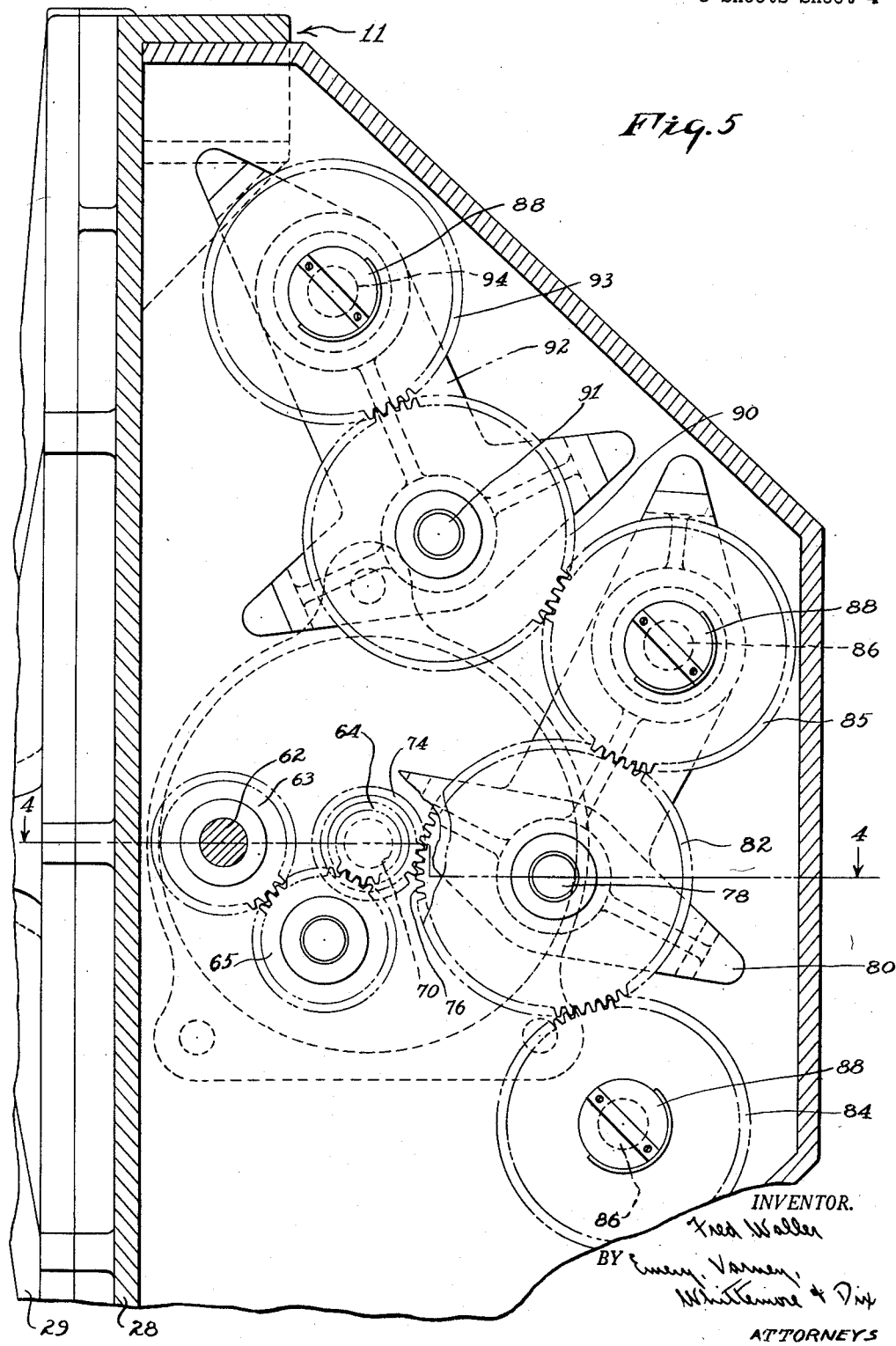

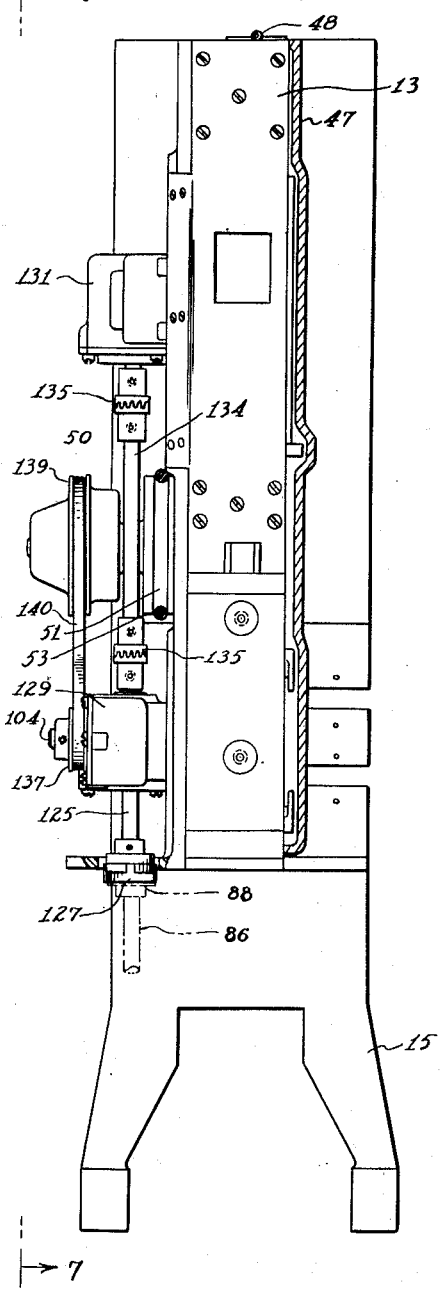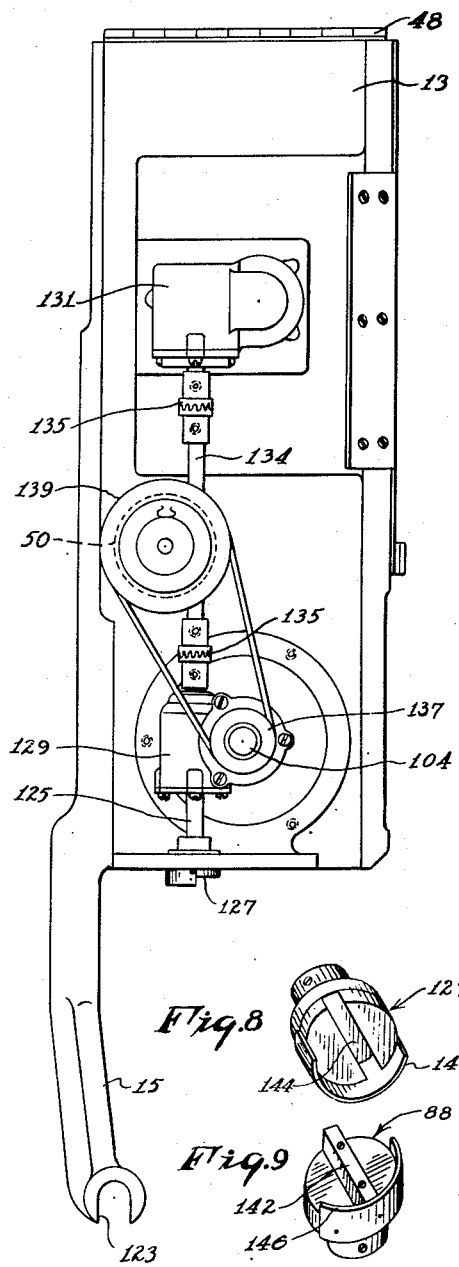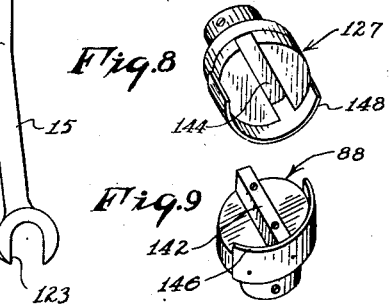

2,835,160

CAMERA WITH FILM HOLDERS FOR CONVENIENT LOADING

Fred Waller, Huntington, N. Y., assignor to The Vitarama Corporation, Huntington, N. Y., a corporation of New York Application February 11, 1953, Serial No. 336,303

6 Claims. (Cl. 88—16.6)

This invention relates to cameras and more particularly, to magazines for moving-picture cameras.

It is an object of the invention to provide a moving-picture camera with improved means for attaching and detaching a film-carrying magazine quickly and conveniently.

It is another object of the invention to provide a multi-lens, moving-picture camera which takes adjacent scenes on separate films for use in producing mosaic images on a screen. The invention provides separate magazines for the separate film strips, and each of the magazines has a film-feeding mechanism and a pull-down, which is an integral part of the magazine and which is attached to the camera behind any one of the lenses with which the film is to be used.

One feature of the invention relates to the co-ordinating of the operation of separate pull-down mechanisms which are attached to removable film magazines used with a multilens camera. The invention also includes means for operating the pull-downs in a predetermined time relation with a shutter mechanism which admits light to the lenses. Other features relate to the driving of the various parts from a common motor mechanism, and to motion-transmitting connections which automatically connect each pull-down and film feed and take-up mechanism to the shutter drive with a predetermined timing.

Other objects, features and advantages of the invention will appear or be pointed out as the description proceeds.

In the drawing, forming a part hereof, in which like reference characters indicate corresponding parts in all the views;

Figure 1 is a diagrammatic side elevation of a moving-picture camera having the detachable magazine and film feed of this invention;

Figure 2 is an enlarged top view, partly broken away, showing a multilens camera equipped with the removable film magazine and pull-down mechanism of this invention;

Figure 3 is a front view of the camera shown in Figure 2;

Figure 4 is a side view, mostly in section, through the camera shown in Figures 2 and 3;

Figure 5 is a top view, taken on the plane 5—5 of Figure 4, showing the locations of the driving connections for the separate film feed and pull-down mechanisms;

Figure 6 is a front view of the housing of the film feed and pull-down mechanism shown in Figure 4;

Figure 7 is a side view of the structure shown in Figure 6;

Figures 8 and 9 are perspective views of the drive coupler that is used for connecting each film feed mechanism to the driving connections in the base of the camera.

The camera assembly, shown in Figure 1, includes a main camera body 11, a film magazine 12, and a housing 13 which contains film feed and pull-down mechanism. The housing 13 is detachably secured to the main camera body 11, partly by a bracket 15 which fits over a pin 16, carried by lugs 17, which extend downwardly from the back of the housing 13. When the other fastening means are disconnected, the housing 13 swings, about the pin 16 as a pivot, into the dotted line position shown in Figure 1.

The magazine 12 includes two reel containers 21 and 22, which are integrally connected with a center housing 24 of the magazine. The magazine 12 is rigidly connected to the back wall of the film feed and pull-down housing 13.

Whenever a reel of film has been exposed, the fastenings connecting the housing 13 to the main camera body 11 are released, the unitary assembly comprising the housing 13 and magazine 12 is swung rearwardly about the pin 16, and this assembly is then removed from the camera by lifting the bracket 15 from the pin 16. A new film feed and magazine assembly is attached to the camera in place of the one removed to provide a fresh reel of unexposed film.

Figure 2 shows a top view of the camera. The main camera body 11 has a front plate 28 and a cover 29 secured to the outside of the front plate 28. This cover 29 encloses a chamber in which is located the shutter of the camera. The construction of the shutter will be explained in connection with Figure 4. For the present, it is sufficient to understand that there is an opening 30 through the cover of the front plate for admitting light to the lenses of the camera when the shutter is in the proper position for exposing the films. A base 32 extends rearwardly from the front plate 28. There are camera-alignment guides 35, 36 and 37 extending upwardly from the base 32. Each of these alignment guides 35—37 includes a lens 35'—37' in position behind the opening 30 and with the optical axes of the lenses converging to a crossover point which is in the plane of the shutter, or approximately so.

A housing 39 for a film feed and pull-down mechanism is located behind the camera alignment guide 35, and is connected with this alignment guide in a manner which will be explained in connection with Figure 4. The housing 13 is located behind the camera alignment guide 36 and is connected with that alignment guide. A third housing 41 is located behind the camera alignment guide 37 and is connected to it in the same manner as the housings 39 and 13 are connected to their alignment guides. A film magazine 43 is attached to the back of the housing 39 and forms, with the housing 39, a detachable film feed and magazine assembly for operation with the lens 35'. The magazine 12 is secured to the back of the housing 13; and a similar magazine 45 is secured to the back of the third housing 41. Each of the housings 39, 13 and 41 has a side cover 47 attached to the housing by a hinge 48.

The other side of each housing supports driving mechanism which includes a slip clutch 50 and a pulley 51 driven by the slip clutch 50. A belt 53 connects the pulley 51 with a driven pulley 54 that turns the take-up reel of the film magazine.

Figure 4 shows a shutter 56 located in the chamber between the front plate 28 and the cover 29. This shutter is supported by a shaft 57 which turns in bearings 58. The shaft 57 is driven by gearing 60 from shutter drive shafting 62.

The shutter drive shafting 62 has a pinion 63 at its lower end driven from a driving pinion 64 through an idler gear 65. In the construction shown, the shafting 62 includes a coupling 66 located just below the gearing 60.

The main camera body has a bottom 68 secured to it. This bottom has an opening 69 through which the armature shaft 70, of a motor 71, extends. The motor 71 is attached to a motor mount 73 on the bottom 68, and other motors can be attached to the mount in place of the motor 71 when the camera is to be operated on different kinds of voltage.

Another driving pinion 75, located below the pinion 64, is driven by the motor and transmits motion to a gear 76 with which it meshes.

The gear 76 is secured to the lower end of a vertical shaft 78 that rotates in bearings 79 carried by a bracket 80 rigidly fixed to the base 32. A gear 82 is secured to the upper end of the shaft 78.

Figure 5 shows the gear 82 in mesh with two other gears, 84 and 85. Each of these gears 84 and 85 is connected to a vertical shaft 86 that extends upwardly through the base 32 to provide a driving connection for one of the film feeds. There is a drive coupler 88 at the upper end of each shaft 86.

The gear 85 also meshes with an idler gear 90 on a shaft 91 which turns in bearings in a bracket 92. This idler 90 meshes with another gear 93 on a shaft 94, which turns in other bearings supported by the bracket 92. The upper end of the shaft 94 extends through the base 32 and has a drive coupler 88 attached to its upper end for supplying power to drive the film feed mechanism in the third housing.

When each of the detachable film feed and magazine assemblies is placed on the base 32, the power input shaft of the assembly is connected with the drive coupler 88 in a manner which will be explained in connection with Figures 7 and 8.

Referring again to Figure 4, film 98 is fed forwardly into the housing 13 along a guide 99, under rollers 101 and 102 and across an arc of a driving sprocket 103 secured to a shaft 104. This film is deflected upwardly and rearwardly by another guide 105, and the film loops upwardly in the housing across a pull-down mechanism 107.

This pull-down mechanism 107 has a film gate 109 located immediately behind the lens 36'. There is a handle 111 which can be turned to regulate the loop of film. Below the pull-down mechanism 107, the film 98 travels past the front of the guide 105 and across a roller 114 which brings the film into contact with an arc of the driving sprocket 103. Another roller 115 holds the film 98 against the sprocket 103 for a substantial angle of wrap, and the film then passes across a guide 116 and rearwardly through an opening in the back wall of the housing 13. This rearwardly moving run of film travels to the take-up reel of the magazine 12.

The housing 13 must register accurately with the optical axis of the lens 36', and this alignment is obtained by having dowel pins 120 extending from the rearward face of the camera alignment guide 36. Openings 121 in the front wall of the housing 13 fit the dowel pins 120 to insure exact location of the housing 13 and more especially the film gate 109, with respect to the optical axis of the lens 36'.

The bracket 15 has a slot 123 which fits over the pin 16. This provides a bearing on which the bracket 15 and the film feed and magazine assembly can pivot, and it also provides play for register of the openings 121 with the dowel pins 120, and for the convenient removal of the film feed and magazine assembly from the pin 16 by merely lifting the bracket from the pin.

Figure 6 shows a front view of the housing 13. At one side of this housing, there is a vertical drive shaft 125 which has a driven coupler 127 secured to its lower end, and this driven coupler engages the driving coupler 88 on the vertical shaft 86 which extends upwardly through the base 32. The shaft 125 extends into a gear box 129. The shaft 104 from the film driving sprocket also extends into this gear box. Power from the shaft 125 is transmitted to the sprocket drive shaft 104 by a gear, preferably worm gearing, in the gear box 129.

There is an upper gear box 131 which drives the pull-down mechanism within the housing 13 and this upper gear box is driven from the lower gear box 129 through a connecting shaft 134 and couplings 135.

A pulley 137, on the end of the shaft 104, outside of the gear box 129, drives an upper pulley 139 through a belt 140. The pulley 139 is a part of the driven side of the slip clutch 50, and power from the pulley 139 is delivered through the slip clutch to the pulley 51, which drives the take-up reel in the film magazine, as previously explained.

When the housing 13 is placed on the base 32, it is important to connect the shafts 125 and 86 with these shafts at the correct phase angle to one another. The couplers 88 and 127 prevent these shafts from being connected unless they are at the correct phase angle to one another. This result is obtained by having the couplers 88 and 127 constructed as shown in Figures 8 and 9. There is a tongue 142 on the drive coupler 88 which engages in a groove 144 of the driven coupler 127; and by having a skirt 146 at one end of the tongue 142 and a complementary skirt 148 at the opposite end of the groove 144. There would be only two positions, 180° from one another, at which the tongue 142 could be engaged in the groove 144. By having the skirts 146 and 148 at opposite ends of the tongue 142 and groove 144, respectively, there is only one position in each revolution where the tongue and groove can be engaged.

The preferred embodiment of the invention has been illustrated and described, but changes and modifications can be made without departing from the invention as defined in the claims.

What is claimed is:

1. In a camera having a plurality of lenses on a main camera body and a common shutter that controls the passage of light through said lenses to films at the focal planes of the lenses, the improvement which comprises separate film holders including spindles for film reel spools for the film behind each lens, a separate gate behind each lens and at the focal plane of the lens, film feeding means including a separate pull-down for moving the film past each gate, common supporting means for the film holders, gate and pull-down for the film behind each lens whereby said supporting means with its film holder, gate and film feeding means comprise a unitary assembly, a fulcrum bearing on the main camera body behind each of the lenses, and a bearing at one end of each unitary assembly and that fits the fulcrum bearing for supporting that end of the assembly from the main camera body for swinging movement toward and from the corresponding lens, and a light-tight frame on the main camera body against which each of the film-carrying assemblies fits when swung about its fulcrum bearing into a forward position, each assembly having an abutment thereon that contacts with the main camera body to stop further swinging movement of the film carrying assembly when the gate reaches the focal plane of the lens for that assembly.

2. The camera structure described in claim 1 and in which there are motion transmitting connections between the different film-carrying assemblies for causing the film-feeding means of the different assemblies to operate in timed relation with one another.

3. The camera construction described in claim 1, and in which there are common driving means for all of the film-feeding means, the common driving means being located on the main camera body, and driving connections through which most of the common driving means is transmitted to each film-carrying assembly including a slip connection that engages and dis-engages as a film assembly is swung on its fulcrum bearing toward and from its corresponding lens.

4. The camera construction described in claim 1, and in which the lenses are located with their optical axes converging toward a point in front of the camera, and all of the film-carrying assemblies extend in different directions from one another and in substantial alignment with the optical axes of their corresponding lenses, and the fulcrum bearing for each film-carrying assembly extends in a direction substantially at right angles to a plane through the optical axis of the lens corresponding to the film-carrying assembly supported by that fulcrum bearing.

5. The camera structure described in claim 1, and in which there is a common power-driving means on the main camera body for the shutter and the film-feeding means of all of the film-carrying assemblies, including motion-transmitting connections that operate the film-feeding means in timed relation with the shutter and with one another, said motion-transmitting connections including rotatable elements on both the main camera body and one of the film-carrying assemblies; the rotatable element on the film-carrying assembly being in a position to confront the rotatable element on the camera body when the film-carrying assembly is in its forward position, and the confronting surfaces of the rotatable elements having complementary shapes that engage with one another to provide a jaw clutch through which motion is transmitted from one rotatable element to the other.

6. The camera structure described in claim 1, and in which all of the fulcrum bearings are located at the lower part of the main camera body and at the back thereof, and the bearing at one end of each unitary assembly is at the lower end of the assembly and consists of an open-ended yoke which hooks over the fulcrum bearing as the unitary assembly is moved downwardly and forwardly with respect to the main camera body and while in a rearwardly sloping position with respect to the main camera body.

References Cited in the file of this patent

UNITED STATES PATENTS

| | | |
|---|---|---|
| 1,612,860 | Fairchild | Jan. 4, 1927 |
| 1,840,861 | Walker | Jan. 12, 1932 |
| 1,890,074 | Briechle et al. | Dec. 6, 1932 |
| 1,970,212 | York | Aug. 14, 1934 |
| 2,339,810 | Richards | Jan. 25, 1944 |
| 2,362,019 | Moore | Nov. 7, 1944 |

FOREIGN PATENTS

| | | |
|---|---|---|
| 657,324 | France | Jan. 15, 1929 |